United States Patent [19]
DuPuy et al.

[11] Patent Number: 4,997,245
[45] Date of Patent: Mar. 5, 1991

[54] POLARIZATION INDEPENDENT OPTICAL SWITCHES

[75] Inventors: Richard E. DuPuy, Aloha, Oreg.;
Leon McCaughan, Madison, Wis.;
Edwin B. Osgood, Beaverton, Oreg.

[73] Assignee: Smiths Industries Aerospace & Defense Systems Incorporated, Grand Rapids, Mich.

[21] Appl. No.: 460,760

[22] Filed: Jan. 4, 1990

[51] Int. Cl.$^5$ .............................................. G02B 6/10
[52] U.S. Cl. .............................. 350/96.14; 350/96.13
[58] Field of Search ........................ 350/96.11–96.14; 250/227, 227.15; 356/73.1

[56] References Cited

U.S. PATENT DOCUMENTS

| | | | |
|---|---|---|---|
| 4,120,560 | 10/1978 | Baues et al. | 350/96.14 |
| 4,243,295 | 1/1981 | Alferness | 350/96.14 |
| 4,618,210 | 10/1986 | Kondo | 350/96.14 |
| 4,690,489 | 9/1987 | Neyer | 350/96.14 |
| 4,756,588 | 7/1988 | Granestrand | 350/96.14 |
| 4,787,692 | 11/1988 | Spanks | 350/96.16 |
| 4,811,210 | 3/1989 | McAulay | 364/200 |
| 4,815,803 | 3/1989 | Faulkner et al. | 350/96.14 |

OTHER PUBLICATIONS

Y. Tanisawa et al., "Low Crosstalk and Polarization Independent Ti:LiNbO$_3$ Optical Waveguide Switch for OTDR", Proceedings, Conference on Integrated and Guided Wave Optics, 240 (1988).

L. McCaughan, "Low-Loss Polartization-Independent Electrooptical Switches at $\lambda = 1.3$ $\mu$m", IEEE J. Lightwave Tech., LT-2, 51 (1984).

*Primary Examiner*—Akm Ullah
*Attorney, Agent, or Firm*—Dellett, Smith-Hill and Bedell

[57] ABSTRACT

An electrooptical device comprises a substrate of electrooptic material having first, second and third optical waveguide formed therein. The first and second waveguides have first and second waveguide segments respectively, and the third waveguide has third and fourth waveguide segments extending adjacent the first and second waveguide segments respectively, so that first and second directional couplers are formed. The interaction length of the first directional coupler is slightly greater than an optimum interaction length for a predetermined wavelength and the interaction length of the second directional coupler is slightly less than an optimum interaction length for the predetermined wavelength. A first electrode structure influences the first directional coupler and a second electrode structure influences the second directional coupler. Potentials can be applied to the first and second electrode structures such that for the predetermined wavelength first and second states of the device can be established in which polarized light is propagated from one end of the first waveguide to one end of the second waveguide with higher and lower transmissions respectively and the transmission in the first state is substantially independent of the polarization eigen state.

17 Claims, 3 Drawing Sheets

POLARIZATION INDEPENDENT OPTICAL SWITCHES

BACKGROUND OF THE INVENTION

This invention relates to optical switches.

Figure 1:
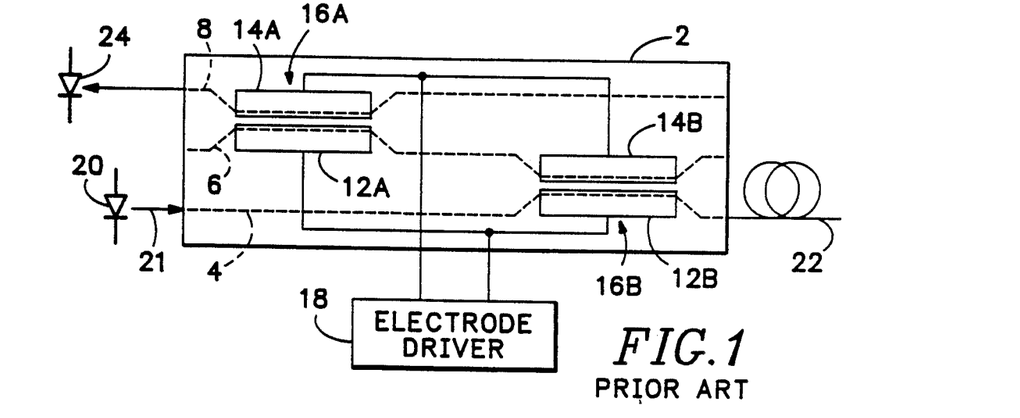
FIG. 1 is a schematic top plan view of a conventional optical switch.

An optical switch is used in an optical time domain reflectometer (OTDR) to control propagation of light from a light source within the reflectometer, typically a laser diode, to a fiber under test and from the fiber under test to a detector, such as an avalanche photodiode. As shown in FIG. 1, a switch that may be used for this purpose comprises a substrate 2 of Z-cut LiNbO$_3$ having diffused titanium waveguides 4–8 formed therein and electrodes 12, 14 deposited on the substrate. The waveguide 6 has two segments that extend adjacent respective segments of waveguides 4, 8 so that two directional couplers 16A, 16B are formed. The waveguide segments that form the directional couplers are positioned so that the Z component $E_z$ of the electric field established by electrodes 12, 14 interacts differentially with the optical modes propagating in the waveguide segments. Thus, a voltage applied to electrodes 12, 14 by an electrode driver 18 establishes an electric field that can affect the coupling of light between the waveguides.

Electrode driver 18 is able to establish two distinct states for the optical switch In a first state of the switch, the directional couplers are each in the bar state, and light from the laser diode 20 is coupled through a fiber 21, waveguide 4 and coupler 16B into the fiber under test 22. In the first state, reflected light entering waveguide 4 from fiber 22 is coupled into fiber 21. In the second state of the switch, couplers 16A, 16B are each in the cross state and light from the fiber under test is coupled to detector 24 through waveguide 6, couplers 16A, 16B and waveguide 8.

The fraction of light that is coupled across a directional coupler is known as the coupling ratio of the coupler. The switch transmission of a switch in a given state is the fraction whose denominator is the optical power entering the switch at one fiber port and whose numerator is the optical power emitted by way of another fiber port in that state, and is a combination of the coupling loss (the complement of the coupling ratio) for each coupler and the non-coupling losses (waveguide losses and fiber/substrate interface losses), which are typically about 3 dB.

In operation of the OTDR, a laser driver (not shown) energizes laser diode 20 to emit a brief light pulse, and electrode driver 18 places the switch in the first state, so that the light pulse is coupled into fiber 22. For a short time following launch of the pulse into fiber 22, reflected light is received from fiber 22. During intervals in which the reflections are weak, the switch is placed in the second state and the reflections are coupled to detector 24. During intervals in which strong reflections are received, the switch is placed in its first state, and detector 24 is optically isolated from fiber 22. The manner in which the electrode driver is controlled to place the switch in the first or second state when needed is well understood by those skilled in the art. Suitable techniques are described in co-pending U.S. patent application Ser. No. 07/329,796 filed Mar. 28, 1989.

The reflected light received from fiber 22 may be polarized. In order that the polarization state of reflected light should not influence the detection of the intensity of the reflected light, it is essential that the optical switch should pass all polarizations equally, i.e., the switch should be polarization independent. In the case of a switch of the kind shown in FIG. 1, this necessitates that the switch transmission of the switch in the cross state be the same for the TM and TE modes.

In Y. Tanisawa, T. Aoyama, R. Ishikawa, M. Kondo and Y. Ohta, "Low Crosstalk and Polarization Independent Ti:LiNbO$_3$ Optical Waveguide Switch for OTDR", Proceedings, Conference on Integrated and Guided Wave Optics, 240 (1988), polarization independence of the passive coupling ratios of a switch of the type shown in FIG. 1 is achieved by controlling both the concentration with which Ti is diffused into the LiNbO$_3$ to form the waveguides and the spacing between the waveguides. However, the waveguide losses and fiber/substrate interface losses are polarization dependent, and therefore the switch transmission of a switch of the kind shown by Tanisawa et al will not be polarization independent.

For light of a given wavelength and polarization, the passive coupling ratio of a directional coupler is a function of the interaction length of the coupler (a physical characteristic of the coupler). The function is periodic, and the period of the function is called the coupling length. The coupling length is a function of wavelength and polarization. For a given wavelength and polarization, the passive coupling ratio is a maximum when the interaction length is equal to an odd multiple of the coupling length for that wavelength and polarization and is a minimum when the interaction length is equal to an even multiple of the coupling length.

The coupling length for a given wavelength and polarization is an exponential function of the separation between the waveguides. The coefficients of the exponential relationships for the two polarizations (TM and TE) at a given wavelength are not the same and therefore the TM and TE coupling lengths can be varied with a degree of independence. Accordingly, a directional coupler can be fabricated so that the interaction length is equal to both an odd multiple of the TM coupling length and an odd multiple of the TE coupling length. Such an interaction length is referred to herein as an "optimum interaction length". L. McCaughan, "Low-Loss Polarization-Independent Electrooptical Switches at $\lambda = 1.3$ μm", IEEE J. Lightwave Tech., LT-2, 51 (1984) describes a switch based on a directional coupler in which the number of coupling lengths for the TE and TM polarizations are equal and odd numbered.

Although the passive coupling ratio of a directional coupler in which the interaction length is equal to both an odd multiple of the TM coupling length and an odd multiple of the TE coupling length is polarization independent, polarization-dependent effects occur where the fibers are coupled to the substrate and in propagation through the substrate. Consequently, when a directional coupler having an optimum interaction length is used in the optical switch of an OTDR, propagation of light from the fiber under test to the detector in the cross state is not polarization independent.

Figure 2:
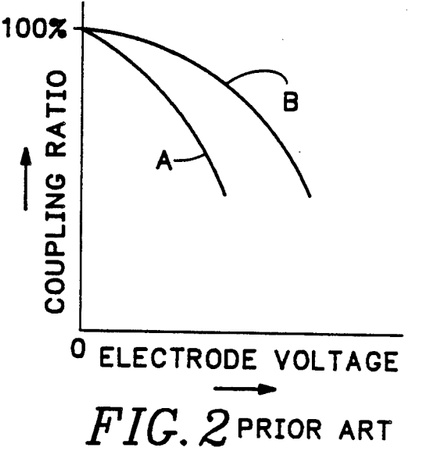
FIG. 2 is a graph showing coupling ratio of a directional coupler as a function of electrode voltage.
Figure 3:
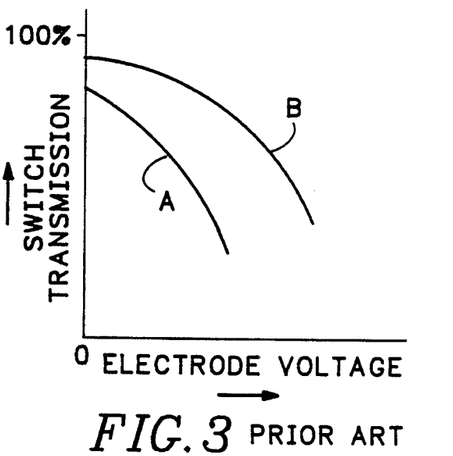
FIG. 3 is a graph showing switch transmission of an optical switch as a function of electrode voltage.

FIG. 2 shows the coupling ratio of a directional coupler as a function of electrode voltage for a directional coupler for which the interaction length is equal to an optimum interaction length. Curve A relates to the TM polarization and curve B to the TE polarization. As shown, in the cross state, i.e. with a zero electrode voltage, 100% coupling takes place from one waveguide to the other. For a non-zero electrode voltage, the coupling ratio is reduced. Curves A and B in FIG. 3 show the switch transmission for the TM and TE polarizations from the fiber under test to the detector of an OTDR by a switch based on a directional coupler whose coupling ratio varies with voltage in the manner shown in FIG. 2. As shown in FIG. 3, at zero electrode volts, both the TE and TM polarizations suffer losses, and these losses are unequal. Specifically, the TM polarization suffers greater loss than the TE polarization. Consequently, the coupling from the fiber under test to the detector is not polarization independent.

Figure 4:
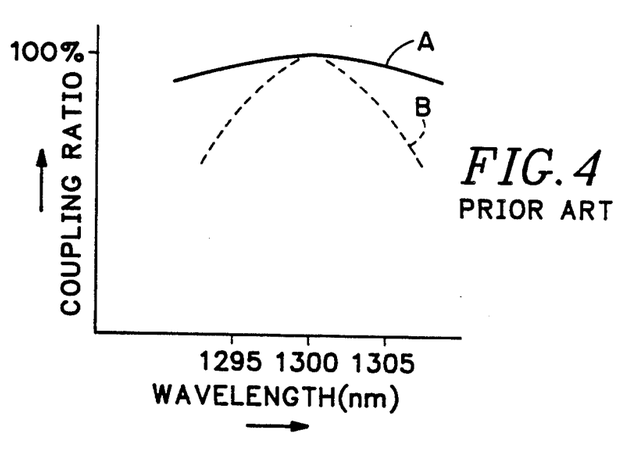
FIG. 4 is a graph showing passive coupling ratio of a directional coupler as a function of wavelength.

The TM and TE coupling lengths are wavelength dependent. Therefore, a directional coupler having a polarization-independent coupling mechanism provides 100% transmission in the cross state only for a single wavelength. Curves A and B in FIG. 4 show passive coupling ratio for the TM and TE polarizations as a function of wavelength for a directional coupler having an interaction length equal to the TM coupling length for light at 1300 nm and to three times the TE coupling length at that wavelength. It will be noted that the two curves are similar except that the roll-off with wavelength is not as severe for the TM polarization as for the TE polarization. It can be seen that for the TE polarization the passive coupling ratio decreases quite rapidly as a function of wavelength and may be only about 80% at a wavelength less than about 1295 nm or more than about 1305 nm. Therefore, if such a directional coupler is used in the optical switch of an OTDR, the performance of the switch, and thus the sensitivity of the OTDR, depends strongly on the wavelength of the laser diode. Moreover, if two directional couplers are connected in series, as shown in FIG. 1, the roll-off is even more rapid. The processes for fabrication of laser diodes are not sufficiently developed that a wavelength difference of less than about 10 nm can be achieved from diode to diode in a production run. Consequently, if the laser diode in an OTDR fails and is replaced, the sensitivity of the OTDR after replacement is generally significantly different from its sensitivity before replacement unless the diodes have been matched with respect to wavelength.

In Alferness, U.S. Pat. No. 4,243,295 issued Jan. 6, 1981, the concept of spatial tapering (varying the distance between the waveguides of a directional coupler as a function of length within the domain of the interaction length) is described. This spatial tapering makes it possible to achieve high isolation in the bar state for both polarization states at a common drive voltage.

SUMMARY OF THE INVENTION

In accordance with a first aspect of the present invention, an electrooptic device for optically coupling first and second optical fibers comprises a substrate of electrooptic material having first, second and third optical waveguides formed therein for supporting propagation of light in first and second polarization eigen states. The electrooptic material is such that the functions relating coupling between waveguides in the material to electric field existing in the material are different for the two polarization eigen states. The first optical fiber is coupled to the substrate to introduce light into the first waveguide at one end thereof and the second optical fiber is coupled to the substrate to receive light emitted from the second waveguide at one end thereof. The first and second waveguides have first and second waveguide segments respectively, and the third waveguide has third and fourth waveguide segments extending adjacent the first and second waveguide segments respectively so that first and second directional couplers are formed. The interaction length of one directional coupler is slightly greater than an optimum interaction length for a predetermined wavelength and the interaction length of the other directional coupler is slightly less than an optimum interaction length for the predetermined wavelength. The device also comprises first electrode means for influencing the first directional coupler such that for the predetermined wavelength two distinct states are defined in which light introduced into the first waveguide at said one end thereof and propagating in the first waveguide segment is coupled to the third waveguide segment with higher and lower coupling ratios respectively, and second electrode means for influencing the second directional coupler such that for the predetermined wavelength two distinct states are defined in which light propagating in the fourth waveguide segment is coupled to the second waveguide segment with higher and lower coupling ratios respectively. Potentials can be applied to the first and second electrode means such that for the predetermined wavelength first and second states of the device can be established in which polarized light is propagated from the first fiber to the second fiber with higher and lower transmissions respectively and the transmission in the first state is substantially independent of the polarization eigen state.

In accordance with a second aspect of the present invention, an electrooptic device for selectively coupling light from a first port to a second port comprises a first substrate portion of electrooptic material having first and second optical waveguides formed therein and spaced so that the interaction length of the first and second waveguides is slightly greater than an optimum interaction length for a predetermined wavelength, and first electrode means for influencing optical coupling between the first and second waveguides. The first waveguide is coupled at one end to the first port, such that for a first wavelength, less than the predetermined wavelength, a cross state is defined in which light entering the first waveguide at its one end is coupled to the second waveguide and leaves the second waveguide at one end thereof, and a bar state is defined in which light is not strongly coupled from the first waveguide to the second waveguide. The device also comprises a second substrate portion of electrooptic material having third and fourth optical waveguides formed therein and spaced so that the interaction length of the third and fourth waveguides is slightly less than an optimum interaction length for the predetermined wavelength, and second electrode means for influencing optical coupling between the third and fourth waveguides. The third waveguide is coupled at one end to the second port, such that for a second wavelength, greater than the predetermined wavelength, a cross state is defined in which light entering the fourth waveguide at one end thereof is coupled to the third waveguide and leaves the third waveguide at its one end, and a bar state is defined in which light is not strongly coupled from the fourth waveguide to the third waveguide. The one end of the second waveguide is optically coupled to the one end of the fourth waveguide, such that for a third wavelength, which is in a range including the predetermined wavelength, the device has a first state in which light entering the first or third waveguide at its one end is coupled to the third or first waveguide, and a second state in which the first and third waveguides are optically isolated. In the first state of the device, the power loss associated with coupling light from the first waveguide to the third waveguide is substantially independent of the third wavelength.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

In accordance with the invention, an optical switch for use at a predetermined wavelength is based on two directional couplers designed so that the interaction length for one directional coupler is slightly greater than an optimum interaction length, while the interaction length for the other directional coupler is slightly less than an optimum interaction length.

Figure 5:
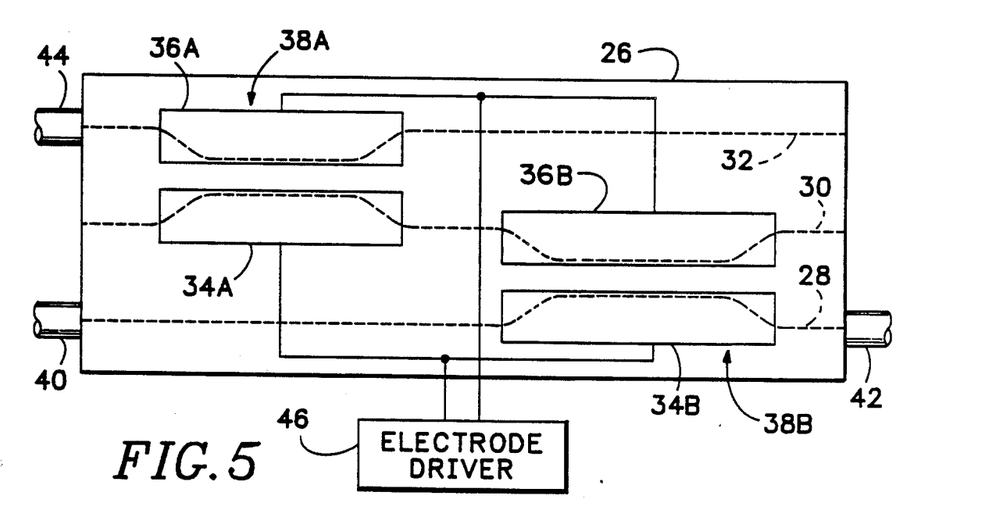
FIG. 5 is a top plan view of an optical switch embodying the present invention.

FIG. 5 shows an optical switch comprising a monocrystalline substrate 26 of LiNbO$_3$ having channel waveguides 28, 30 and 32 formed therein by diffusion of Ti. Waveguide 30 has two segments that extend adjacent respective segments of waveguides 28, 32 so that two tapered directional couplers 38A, 38B are formed. Electrodes 34A, 36A, 34B, 36B overlie respective waveguide segments, so that directional couplers 38A, 38B function as modulators. The waveguides are designed so that for each directional coupler, the coupling length for the TM polarization at 1300 nm is approximately three times the coupling length for the TE polarization at 1300 nm. At one end of waveguide 28, substrate 26 is cemented to a single mode optical fiber 40, which is optically coupled to a laser diode (not shown), and at the other end of waveguide 28 substrate 26 is cemented to a single mode launch fiber 42, which is optically coupled to a fiber under test (not shown). At one end of waveguide 32, substrate 26 is cemented to a fiber 44 that is optically coupled to a detector, such as an avalanche photodiode (not shown). Electrodes 34, 36 are connected to an electrode driver 46 for applying selected potential differences between electrodes 34A, 36A and between electrodes 34B, 36B.

The switch shown in FIG. 5 is intended to be used at a wavelength of 1300 nm, and the interaction length of coupler 38A is somewhat less than an optimum interaction length at 1300 nm whereas the interaction length of coupler 38B is somewhat more than an optimum interaction length at 1300 nm. Since values of the optimum interaction length depend on coupling length, which in turn depends on waveguide spacing, the desired relationships between interaction length and optimum interaction length for the two couplers may be achieved, at least in part, through use of different waveguide spacings for the two couplers. It will be appreciated that in a tapered directional coupler, waveguide spacing may vary continuously as a function of position within the domain of the interaction length between the waveguides. In the preferred embodiment of the invention, the optimum interaction length is three times the TE coupling length and is equal to the TM coupling length.

Figure 6:
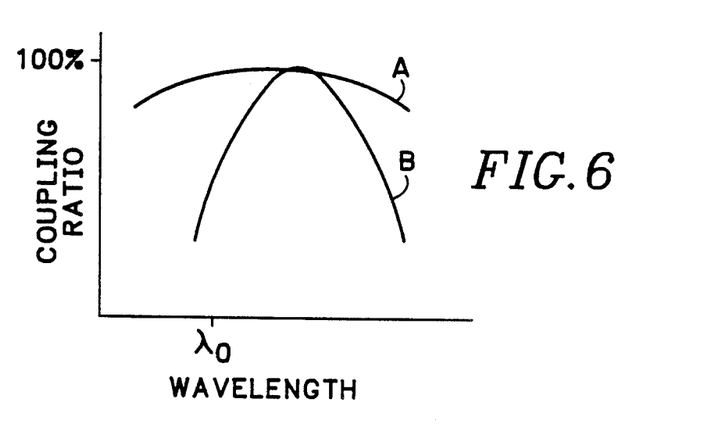
FIGS. 6 and 7 are graphs showing passive coupling ratio as a function of wavelength for the two couplers of the switch shown in FIG. 5.
Figure 7:
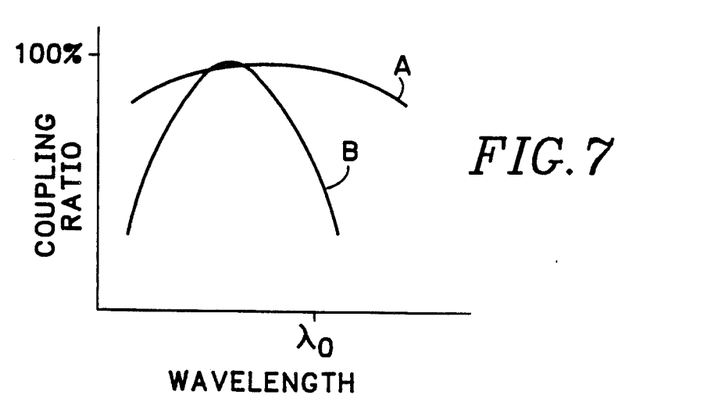
Figure 8:
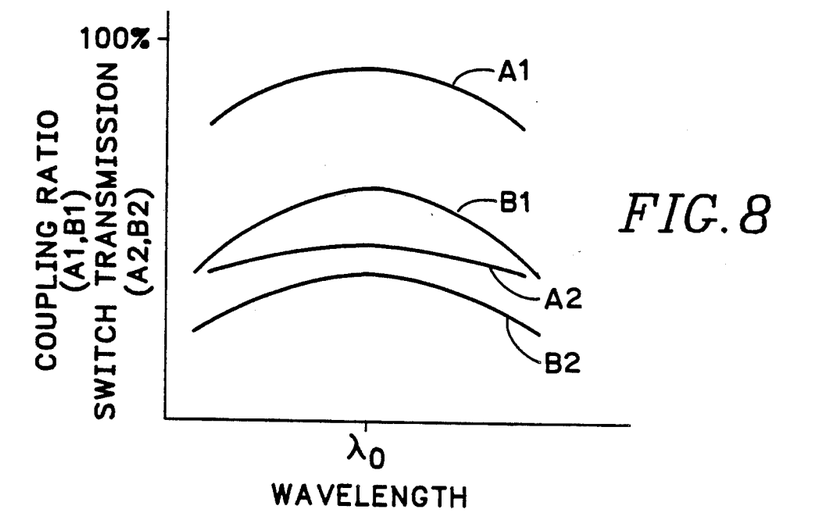
FIG. 8 is a graph showing the combined passive coupling ratio for the directional couplers of the FIG. 5 switch and the switch transmission for the FIG. 5 switch, each as a function of wavelength.

FIGS. 6 and 7 illustrate passive coupling ratio for the two directional couplers 38A and 38B respectively as a function of wavelength. In FIGS. 6 and 7, $\lambda_0$ represents the nominal wavelength for which the switch is designed (1300 nm), and curves A and B relate to the TM polarization and the TE polarization respectively. Since the interaction length of coupler 38A is slightly less than an optimum interaction length at the wavelength $\lambda_0$, coupler 38A has maximum passive coupling ratio for TE and TM polarizations at wavelengths slightly greater than $\lambda_0$. Similarly, coupler 38B has maximum passive coupling ratio for the TE and TM polarizations at wavelengths less than $\lambda_0$. When the two couplers are connected in series, as they are when the switch is in the cross state, the linear scale curves shown in FIGS. 6 and 7 are combined multiplicatively to provide the curves A1 and B1 shown in FIG. 8. The maximum of each curve is at the wavelength $\lambda_0$, but since the TE curves for the individual couplers each roll off more rapidly with wavelength than do the TM curves, the TE curve for the two couplers in series (FIG. 8, curve B1) is depressed below the TM curve (FIG. 8, curve A1). The maxima for curves A1 and B1 are at about 90% and 63% respectively.

The curves A2 and B2 in FIG. 8 represent switch transmission for the FIG. 5 switch, and therefore incorporate non-coupling losses as well as coupling loss. The maxima for curves A2 and B2 are at about 45% and 40% respectively, showing noncoupling losses of 3 dB for the TM polarization and 2 dB for the TE polarization.

Figure 9:
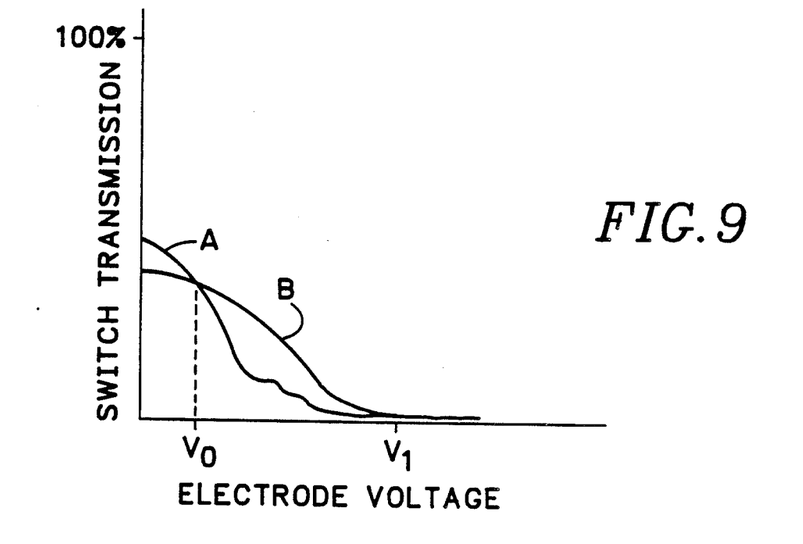
FIG. 9 is a graph showing switch transmission as a function of electrode voltage for the switch shown in FIG. 5.

FIG. 9 shows the switch transmission of the FIG. 5 switch as a function of electrode voltage for the TE and TM polarizations at the wavelength $\lambda_0$. It will be seen that for zero electrode volts, the switch transmission for the TE polarization is less than that of the TM polarization, and that there is an electrode voltage $V_0$ for which the switch transmission for the TE polarization is equal to the switch transmission for the TM polarization. In this state, the transmission from the fiber under test to the detector is polarization independent. When a voltage $V_1$ is applied to the electrodes, the switch transmission for each polarization state is more negative than −50 dB, and so fiber 44 is optically isolated from fiber 42.

For other wavelengths within the range for which the switch is designed, the electrode voltage for which the switch transmission for the TE polarization is equal to the switch transmission for the TM polarization is different from $V_0$. Accordingly, when a laser diode that emits light within that range of wavelengths is installed in the instrument, electrode driver 46 is adjusted to apply the appropriate non-zero bias voltage to the electrodes such that the switch transmission for the TE polarization is equal to the switch transmission for the TM polarization. Preferably, the switch transmission at the wavelength $\lambda_0$ for each polarization is no more negative than −4 dB, corresponding to a coupling loss in the switch of about −1 dB, or a combined coupling ratio for the two directional couplers of about 79%.

It is readily apparent from curves A2 and B2 in FIG. 8 that the switch transmission for the FIG. 5 switch, based on two directional couplers of different interaction lengths, varies much more slowly as a function of wavelength than the switch transmission of the FIG. 1 switch, based on two couplers of the same interaction length. Consequently, use of the switch comprising the two directional couplers in series leads to the advantage that the sensitivity of the OTDR is not so strongly dependent on wavelength as in the case of the switch shown in FIG. 1.

If the two directional couplers 38A, 38B had the same degree of taper, the curves of coupling ratio (TE and TM) vs. voltage for the shorter coupler (coupler 38A) would have considerably wider main lobes than the corresponding curves for the longer coupler. This implies that the voltage that would have to be applied to the electrodes of coupler 38A in order to achieve a given level of isolation would be higher than the voltage that could be used to achieve that same level of isolation in coupler 38B. However, in order to avoid complications in driving the switch, it is desirable that coupler 38A be placed in the bar state by the same voltage that places coupler 38B in its bar state. In the preferred embodiment of the invention, this is accomplished by designing coupler 38A so that its taper is less than that of coupler 38B. This results in a narrowing of the main lobes of the coupling ratio vs. voltage curves for coupler 38A. There is a small decrease in isolation between the detector and the fiber under test when the switch is in the bar state, but the decrease in isolation is acceptable because, in any event, the isolation is much greater than that provided by a single directional coupler in the bar state. Preferably, the switch transmission at the wavelength $\lambda_0$ in the bar state is no more positive than −50 dB, corresponding to a coupling loss in the switch of about −47 dB, or a combined coupling ratio of 0.002%.

It will be appreciated that the invention is not restricted to the particular embodiment that has been described, and that variations may be made therein without departing from the scope of the invention as defined in the appended claims and equivalents thereof. For example, the invention is not limited to the switch transmission being no more negative than −4 dB in the cross state and no more positive than −50 dB in the bar state. A useful device could be constructed in which the switch transmission in the cross state is −6 dB, corresponding to a coupling loss of −3 dB and a combined coupling ratio of 50%, and the switch transmission in the bar state is −40 dB or even −30 dB, corresponding to a combined coupling ratio of 0.02% or 0.2%. Also, other techniques for reducing the switching voltage of the shorter coupler than increasing the taper of that coupler can be employed. The invention is not limited to use in an optical switch for an OTDR, but can be applied to other situations in which two electrooptic devices are arranged in series. Moreover, the invention is not restricted to the case in which equal bias voltages are applied to two directional couplers, since equal switch transmissions for the TE and TM polarizations can be achieved for different bias voltages. For example, if the bias voltage applied to the electrodes of coupler 38A were slightly less than $V_0$, equal switch transmissions at the wavelength $\lambda_0$ would be obtained when the bias voltage applied to the electrodes of coupler 38B has a unique value greater than $V_0$. In the preferred embodiment of the invention, the interaction length for coupler 38A is 7% less than an optimum interaction length and the interaction length for coupler 38B is 7% more than an optimum interaction length, and this allows acceptable performance at wavelengths in the range from 1290 nm to 1310 nm. However, the invention is not limited to these values.

In the preferred embodiment of the invention, as shown in FIG. 5, the switch serves to couple three optical fibers, and polarization-dependent losses occur at the interfaces between the switch and the fibers. Accordingly, the preferred embodiment of the invention is designed to neutralize the effect of these losses so that, in particular, the transmission from fiber 42 to fiber 44 in the cross state is polarization independent. However, the invention is not restricted to the case in which there are polarization-dependent losses at the interfaces with the switch, since in other applications waveguides 28 and 32 might, for example, be optically coupled to a source and receiver respectively by proximity.

What is claimed is:

1. An electrooptic device for selectively coupling light of a predetermined wavelength from a first port to a second port, and comprising:

a first substrate portion of electrooptic material having first and second optical waveguides formed therein and spaced so that the interaction length of the first and second waveguides is slightly greater than an optimum interaction length for said predetermined wavelength, and first electrode means for influencing optical coupling between the first and second waveguides, said first waveguide being coupled at one end thereof to the first port, such that for a first wavelength, less than the predetermined wavelength, a cross state is defined in which light entering the first waveguide at said one end thereof is coupled to the second waveguide and leaves the second waveguide at one end thereof, and a bar state is defined in which light is not strongly coupled from the first waveguide to the second waveguide, a second substrate portion of electrooptic material having third and fourth optical waveguides formed therein and spaced so that the interaction length of the third and fourth waveguides is slightly less than an optimum interaction length for said predetermined wavelength, and second electrode means for influencing optical coupling between the third and fourth waveguides, said third waveguide being coupled at one end thereof to the second port, such that for a second wavelength, greater than the predetermined wavelength, a cross state is defined in which light entering the fourth waveguide at one end thereof is coupled to the third waveguide and leaves the third waveguide at said one end thereof, and a bar state is defined in which light is not strongly coupled from the fourth waveguide to the third waveguide, and means optically coupling said one end of the second waveguide to said one end of the fourth waveguide such that for a third wavelength, the device has a first state in which light entering the first waveguide at said one end thereof is coupled to the third waveguide through said second and fourth waveguides in which light entering the third waveguide at said one end thereof is coupled to the first waveguide through the fourth and second waveguide, and a second state in which the first and third waveguides are optically isolated.

2. A device according to claim 1, wherein the first substrate portion and the second substrate portion are portions of a single monolithic substrate of electrooptic material, and the means optically coupling said one end of the second waveguide to said one end of the fourth waveguide comprise a waveguide segment formed in the single monolithic substrate.

3. A device according to claim 2, wherein the electrooptic material is $LiNbO_3$.

4. A device according to claim 1, wherein the interaction length of the first and second waveguides is slightly greater than $L_{12}$, where $L_{12}$ is equal to the coupling length of the first and second waveguides for said predetermined wavelength and the TM polarization and is equal to three times the coupling length of the first and second waveguides for said predetermined wavelength and the TE polarization, and the interaction length of the third and fourth waveguides is slightly less than $L_{34}$, where $L_{34}$ is equal to the coupling length of the third and fourth waveguides for said predetermined wavelength and the TM polarization and is equal to three times the coupling length of the third and fourth waveguides for said predetermined wavelength and the TE polarization.

5. A device according to claim 4, wherein the interaction length of the first and second waveguides is less than about 1.1 times $L_{12}$ and the interaction length of the third and fourth waveguides is more than about 0.9 times $L_{34}$.

6. A device according to claim 1, wherein the interaction length of the first and second waveguides is about 1.07 times $L_{12}$ and the interaction length of the third and fourth waveguides is about 0.93 times $L_{34}$.

7. A device according to claim 1, wherein the coupling loss of the device in the first state is no more negative than −3 dB and the coupling loss of the device in the second state is no more positive than −27 dB.

8. A device according to claim 7, wherein the coupling loss of the device in the first state is no more negative than −1 dB and the coupling loss of the device in the second state is no more positive than −37 dB.

9. A device according to claim 8, wherein the coupling loss of the device in the second state is no more positive than −47 dB.

10. A device according to claim 1, wherein the first electrode means comprise a first pair of electrodes and the second electrode means comprise a second pair of electrodes, one electrode of the first pair being connected to one electrode of the second pair and the other electrode of the first pair being connected to the other electrode of the second pair.

11. A device according to claim 1, comprising a source of polarized light of said third wavelength, optically coupled to one of said first and second ports, and a detector for detecting light at a wavelength in said range, optically coupled to the other of said first and second ports.

12. A device according to claim 11, wherein the source of polarized light is optically coupled to the first port and the detector is optically coupled to the second port.

13. A device according to claim 11, wherein said source comprises a laser diode positioned to emit light into the first waveguide through the end thereof opposite said one end, and means for receiving light emitted from the first waveguide through said one end thereof and returning light back into the first waveguide.

14. A device according to claim 1, wherein the interaction length of the first and second waveguides is less than about 1.1 times an optimum interaction length for said predetermined wavelength and the interaction length of the third and fourth waveguides is more than about 0.9 times and optimum interaction length for said predetermined wavelength.

15. An electrooptic device for optically coupling first and second optical fibers, said device comprising:

a substrate of electrooptic material having first, second and third optical waveguides formed therein for supporting propagation of light in first and second polarization eigen states, the electrooptic material being such that the functions relating coupling between waveguides in the material to electric field existing in the material are different for the two polarization eigen states, and the first optical fiber being coupled to the substrate to introduce light into the first waveguide at one end thereof and the second optical fiber being coupled to the substrate to receive light emitted from the second waveguide at one end thereof, the first and second waveguides having first and second waveguide segments respectively, and the third waveguide having third and fourth waveguide segments extending adjacent the first and second waveguide segments respectively so that first and second directional couplers are formed, the interaction length of one of the first and second directional couplers being slightly greater than an optimum interaction length for a predetermined wavelength and the interaction length of the other of the first and second directional couplers being slightly less than an optimum interaction length for said predetermined wavelength, and the device also comprising:

first electrode means for influencing the first directional coupler such that for said predetermined wavelength two distinct states are defined in which light introduced into the first waveguide at said one end thereof and propagating in the first waveguide segment is coupled to the third waveguide segment with higher and lower coupling ratios respectively, and second electrode means for influencing the second directional coupler such that for said predetermined wavelength two distinct states are defined in which light propagating in the fourth waveguide segment is coupled to the, second waveguide segment with higher and lower coupling ratios respectively, whereby application of potentials to the first and second electrode means establish first and second states of the device in which polarized light of said predetermined length is propagated from the first fiber to the second fiber with higher and lower transmissions respectively and the transmission in the first state is substantially independent of the polarization eigen state.

16. An electrooptic device according to claim 15, in combination with means for introducing light into the first fiber, so that in the first state of the device light is propagated from the first fiber to the second fiber and in the second state of the device the first fiber is optically isolated from the second fiber.

17. An electrooptic device for optically coupling first and second optical fibers, said device comprising:
- a substrate of electrooptic material having first, second and third optical waveguides formed therein for supporting propagation of light in first and second polarization eigen states, the electrooptic material being such that the functions relating coupling between waveguides in the material to electric field existing in the material are different for the two polarization eigen states,
- the first and second waveguides having first and second waveguide segments respectively, and the third waveguide having third and fourth waveguide segments extending adjacent the first and second waveguide segments respectively so that first and second directional couplers are formed, the interaction length of one of the first and second directional couplers being slightly greater than an optimum interaction length for a predetermined wavelength and the interaction length of the other of the first and second directional couplers being slightly less than an optimum interaction length for said predetermined wavelength,
- and the device also comprising:
- first electrode means for influencing the first directional coupler such that for said predetermined wavelength two distinct states are defined in which light introduced into the first waveguide at one end thereof and propagating in the first waveguide segment is coupled to the third waveguide segment with higher and lower coupling ratios respectively, and
- second electrode means for influencing the second directional coupler such that for said predetermined wavelength two distinct states are defined in which light propagating in the fourth waveguide segment is coupled to the second waveguide segment with higher and lower coupling ratios respectively,
- whereby application of potentials to the first and second electrode means such that for said first and second states of the device in which polarized light of said predetermined wavelength is propagated from said one end of the first waveguide to said one end of the second waveguide with higher and lower transmissions respectively and the transmission in the first state is substantially independent of the polarization eigen state.

* * * * *

UNITED STATES PATENT AND TRADEMARK OFFICE
CERTIFICATE OF CORRECTION

PATENT NO. : 4,997,245
DATED : March 5, 1991
INVENTOR(S) : Richard E. DuPuy et al It is certified that error appears in the above-identified patent and that said Letters Patent is hereby corrected as shown below:

Title Page:
Abstract, line 1, "electrooptical" should be --electrooptic--.

Abstract, line 3, "waveguide" should be --waveguides--.

Column 1, line 28, after "switch" insert a period (.).

Column 9, lines 1 and 2, after "waveguides" insert --or--.

Column 10, line 55, after "the" delete the comma (,).

Column 10, line 61, "length" should be --wavelength--.

Column 12, line 18, delete "such that for said" and insert --establish--.

Signed and Sealed this

Third Day of November, 1992

Attest:

DOUGLAS B. COMER

Attesting Officer    Acting Commissioner of Patents and Trademarks